United States Patent
Smith et al.

(10) Patent No.: US 11,909,220 B2
(45) Date of Patent: Feb. 20, 2024

(54) WIRELESS POWER TX TO TX CONFLICT AND PROTECTION

(71) Applicant: Integrated Device Technology, Inc., San Jose, CA (US)

(72) Inventors: Nicholaus Smith, La Mesa, CA (US); Chan Young Jeong, San Jose, CA (US); Detelin Martchovsky, Fremont, CA (US); Ashley DeWolfe, San Diego, CA (US); Damla Acar, La Mesa, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 658 days.

(21) Appl. No.: 16/709,699

(22) Filed: Dec. 10, 2019

(65) Prior Publication Data

US 2021/0175745 A1  Jun. 10, 2021

(51) Int. Cl.
*H02J 50/10* (2016.01)
*H02J 50/70* (2016.01)
*H02J 50/40* (2016.01)

(52) U.S. Cl.
CPC .............. *H02J 50/10* (2016.02); *H02J 50/70* (2016.02); *H02J 50/40* (2016.02)

(58) Field of Classification Search
CPC .. H02J 50/10; H02J 50/70; H02J 50/40; H02J 7/02; H02J 50/80; H02J 50/90; H02J 50/20
See application file for complete search history.

(56) References Cited

U.S. PATENT DOCUMENTS

| | | | | |
|---|---|---|---|---|
| 2008/0149738 A1* | 6/2008 | Fujita | ................ | H03F 1/56 235/492 |
| 2010/0225272 A1* | 9/2010 | Kirby | ................ | H02J 7/025 320/108 |
| 2015/0244176 A1* | 8/2015 | Van Den Brink | ...... | H02J 7/007 307/104 |

* cited by examiner

*Primary Examiner* — Elim Ortiz
(74) *Attorney, Agent, or Firm* — Haynes and Boone LLP

(57) ABSTRACT

A wireless power device is presented that avoids transmit conflicts. The device can include a rectifier circuit coupled to a coil; a transmit driver coupled to the rectifier circuit; a transmit detect circuit configured to detect receipt of transmitted wireless power at the coil; and a controller coupled to the transmit driver and the transmit detect circuit, the controller receiving a signal from the transmit detect circuit and providing an alert of the presence of the transmitted wireless power, the controller activating the transmit driver to transmit wireless power in absence of the signal. The wireless device can determine an operating mode and in a transmit mode determine presence of a received power. If received power is detected an alert can be provided and an off state initiated. If transmit power is not detected the transmit driver can be activated.

14 Claims, 2 Drawing Sheets

WIRELESS POWER TX TO TX CONFLICT AND PROTECTION

TECHNICAL FIELD

Embodiments of the present invention are related wireless transmission of power and, in particular, to avoiding Tx to Tx conflicts in wireless power systems.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The most common standard for wireless transmission of power is the Wireless Power Consortium standard, the Qi Standard. Under the Wireless Power Consortium, the Qi specification, a magnetic induction coupling system is utilized to charge a single device that is coupled through the receiver coil circuit. In the Qi standard, the receiving device coil is placed in close proximity with the transmission coil while alternate or amended standards may allow the receiving device coil be placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field.

However, these devices may have both transmit functions and receive functions. For example, a phone can be used to receive power and may also be used to transmit power to other devices. If two devices are brought into proximity and both are performing a transmit function, damaging conflicts may result.

Therefore, there is a need to develop better wireless power devices that do not result in transmit conflicts.

SUMMARY

According to some embodiments, a wireless power device is presented that avoids transmit conflicts for devices capable of receiving and transmitting wireless power. The wireless power device can include a rectifier circuit coupled to a coil; a transmit driver coupled to the rectifier circuit; a transmit detect circuit configured to detect receipt of transmitted wireless power at the coil; and a controller coupled to the transmit driver and the transmit detect circuit, the controller receiving a signal from the transmit detect circuit and providing an alert of the presence of the transmitted wireless power, the controller activating the transmit driver to transmit wireless power in absence of the signal. A method of operating a wireless power device to avoid transmit conflicts includes determining an operating mode of the wireless power device; and in a transmit mode determining presence of a transmit power, if transmit power is detected, providing an alert and proceeding to an off state, and if transmit power is not detected, activating a transmit driver to transmit wireless power.

These and other embodiments are discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
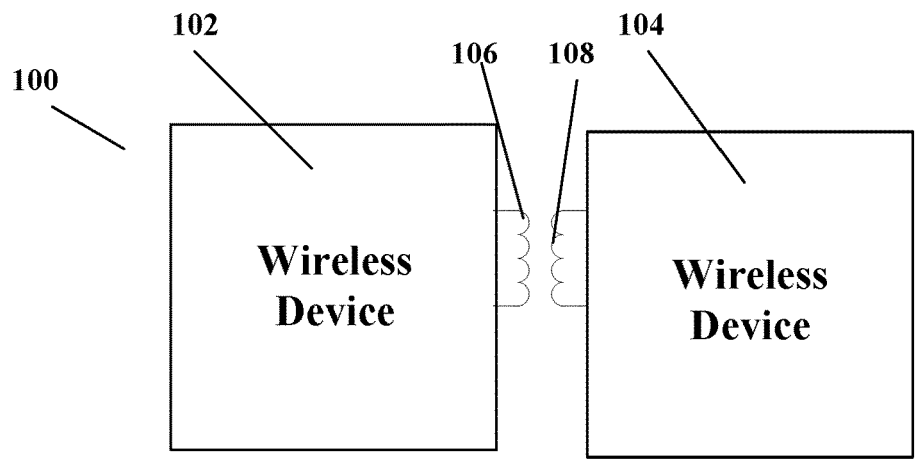
FIG. 1 illustrates a wireless power transmission system.

FIG. 1 illustrates an example wireless power transmission system 100. As illustrated in FIG. 1, a first device 102 is coupled to a coil 106 and a second device 104 is coupled to a coil 108. In general, one of wireless device 102 and wireless device 104 is in a transmit mode and the opposite one in a receive mode. For example, if wireless device 102 is in a transmit mode and wireless device 104 is in a receive mode, then coil 106 is driven to produce a time varying magnetic field that in turn induces a current in coil 108. Coil 108 is coupled to device 104, which can receive the power transmitted through the time varying magnetic field from wireless device 102.

Wireless device 102 and wireless device 104 can be any devices with wireless power functions. Many phones, laptops, tablets, and other devices include a wireless power function. In many cases, these devices can both receive and transmit wireless power. In some examples, one of device 102 and device 104 may be a transmit only device, such as in a stationary wireless power charger, and the opposite device may have a transmit mode and a receive mode.

In situations where both first device 102 and second device 104 are capable of transmitting wireless power, then a potential power conflict results when coils 106 and 108 are brought into contact with both devices 102 and 104 transmitting power. In this case, high current can be induced in both transmitting devices 102 and 104 and high voltages can result on the driver supply rails for both transmitting devices 102 and 104.

Embodiments of the present invention include a detection mode that detects wireless power transmitted by another wireless device that is brought into proximity. If wireless power is detected, then a device that includes the embodiment is prevented from also transmitting wireless power.

Figure 2:
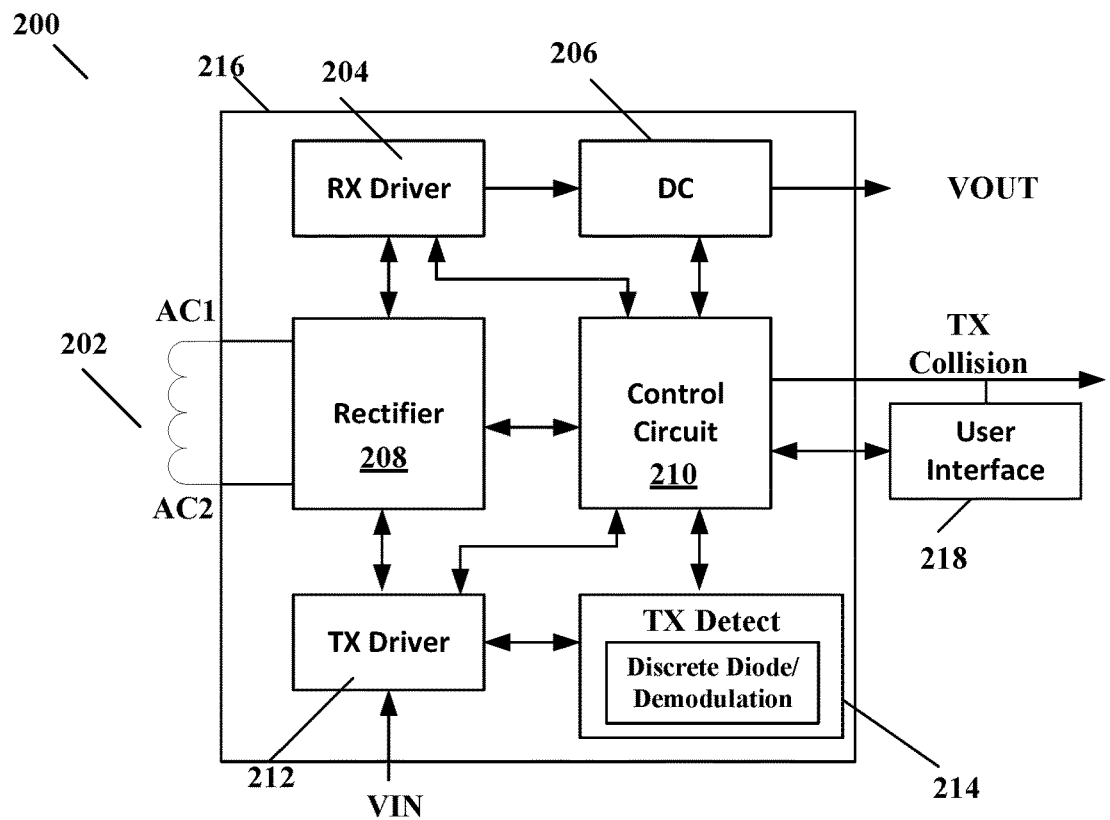
FIG. 2 illustrates a wireless power device.

FIG. 2 illustrates a wireless power device 200 according to some embodiments of the present invention. Wireless power device 200 can be either one of wireless device 102 or wireless device 104 as illustrated in FIG. 1. As is illustrated in FIG. 2, components of wireless power device 200 can be formed on an integrated circuit that can be coupled to a coil 202.

Coil 202 can, in some embodiments, function as both a transmit coil and a receive coil. In some embodiments, coil 202 can be optimized to function as a transmit coil in a transmit mode and optimized to function as a receive coil in a receive coil and, as such, may include difference coil taps for transmit and receive. Coil 202 is coupled to a rectifier 208. Rectifier 208 can function as a rectifier circuit to receive wireless power from coil 202 in a receive mode or as an inverter to drive wireless power through coil 202 in a transmit mode. As such, rectifier 208 can be a full-bridge rectifier formed by a four-transistor bridge coupled across the nodes AC1 and AC2.

In a receive mode, RX driver 204 operates the transistors of rectifier 208 to receive a rectified DC signal from rectifier 208. Rectifier 208 receives an alternating signal from coil 202, which is configured to receive the transmitted wireless magnetic field. The DC signal from rectifier 208 can be provided to a DC circuit 206, which in turn provides an output voltage VOUT. DC circuit 206 can, for example, include filtering and DC conversion circuitry to provide the output voltage VOUT at a particular voltage level or range of voltages. External circuitry can receive the voltage VOUT, which can be used to power circuitry and for charging batteries.

In a transmit mode, TX driver 212 receives an input voltage VIN and drives rectifier 208 to generate an alternating magnetic field through coil 202, which is configured for transmission. In accordance with embodiments of the present invention, a TX detect circuit 214 detects the presence of transmitted wireless power energy at coil 202 and provides signals indicating the presence or absence of transmitted power. In some embodiments, TX detect circuit 214 can be configured to receive a signal from rectifier 208, or directly from coil 202, and indicates the presence of transmitted wireless power if the signal exceeds a threshold level. In some embodiments, the presence of transmitted power can be detected prior to activating TX driver 212 to transmit power. In some embodiments, TX detect circuit 214 monitors to detect the presence of transmitted power while TX driver 212 is activated to transmit power. In either case, in transmit mode, if wireless power is detected incoming in conflict with the operation of sending outbound power, TX detect circuit 214 provides signals to halt TX driver 212 from transmitting power and alerts to the presence of a transmitter power collision.

Detecting incoming power at coil 202 in TX detect 204 may be accomplished in many different ways. For example, a simple rectified level can be obtained using discrete diode and demodulation circuitry (e.g., circuitry intended for decoded messages from a valid receiver) connected to an analog-to-digital converter (ADC) can be used for voltage monitoring. The digital output can be received by control circuit 210. An alternate method may include a frequency counter capable of detecting the incoming voltage or current received by coil 202 at the coil or AC inputs AC1 and AC2. In this frequency detection case an additional protection mechanism may be to use the frequency of the incoming signal to identify the source of the incoming power (e.g. wireless power transmitter, random white noise, RFID, Bluetooth, NFC, etc.). In yet another method, TX detect 214 may include a DC current or voltage sensor capable of detecting voltage or current increases in the direction normally associated with receiving power opposed to the direction naturally occurring when transmitting power. In each of these example cases, a signal indicating that a Tx conflict exists can be generated at control circuit 210.

As is further illustrated in FIG. 2, device 200 may include a control circuit 210. Control circuit 210 is coupled to receive control signals with and receive signals from RX driver 204, DC circuit 206, TX driver 212, TX detector 214, and rectifier 208. Control circuit 210 may include any circuitry that controls the operation of device 200. In some embodiments, control circuit 210 may include a microcomputer or microprocessor with sufficient memory (both volatile and non-volatile) to execute instructions for performing functions described here. Control circuit 210, in particular, receives signals from TX detect circuit 214. As such, TX detect circuit 214 can indicate to control circuit 210 the presence of wireless power at coil 202. In the presence of wireless power, control circuit 210 can instruct TX driver 212 to not transmit power and not provide a PING (which is often provided by a transmitting device in order to detect a receiving device) since the user has placed device 200 in the presence of a transmitting device. In addition, control circuit 210 can excerpt a TX collision signal indicating the presence of wireless transmission. Additionally, control circuit 210 can indicate to DC circuit 206 the presence of a wireless power transmission to prevent high incoming voltage from being provided to the VOUT signal. In these cases, control circuit 210 may activate internal or external circuits that can block the conflicting incoming energy from passing from rectifier 212 to RX driver 204 to prevent the conflicting incoming power to affect VOUT and subsequently affect other devices connected to VOUT. Those devices can then provide voltage and/or current protection. Control circuit 210 may also provide digital or analog signals, shown as TX Collision signal, to other devices indicating the event to allow for user notification of a conflict so that action may be taken by the user to correct the conflict.

In some examples, device 200 may be a transmit only device. In that case, receive driver 204 and DC circuit 206 may be absent and control circuit 210 only operates transmit functions. In general, device 200 can include both a receive function and a transmit function, determined by a device mode in control circuit 210. The device mode may be determined by user input or a receive mode may be initiated when device 200 is placed in the presence of a transmitting device.

As is further illustrated in FIG. 2, control circuit 210 may be coupled to a user input 218. User input 218 may further receive the TX Collision signal, which can alert a user to the presence of a transmit collision. User interface 218 may also be used so that a user can determine the mode of operation of device 200 (e.g. transmit mode, receive mode, or off). In some embodiments, device 200 may automatically enter receive mode in the presence of wireless power.

Figure 3:
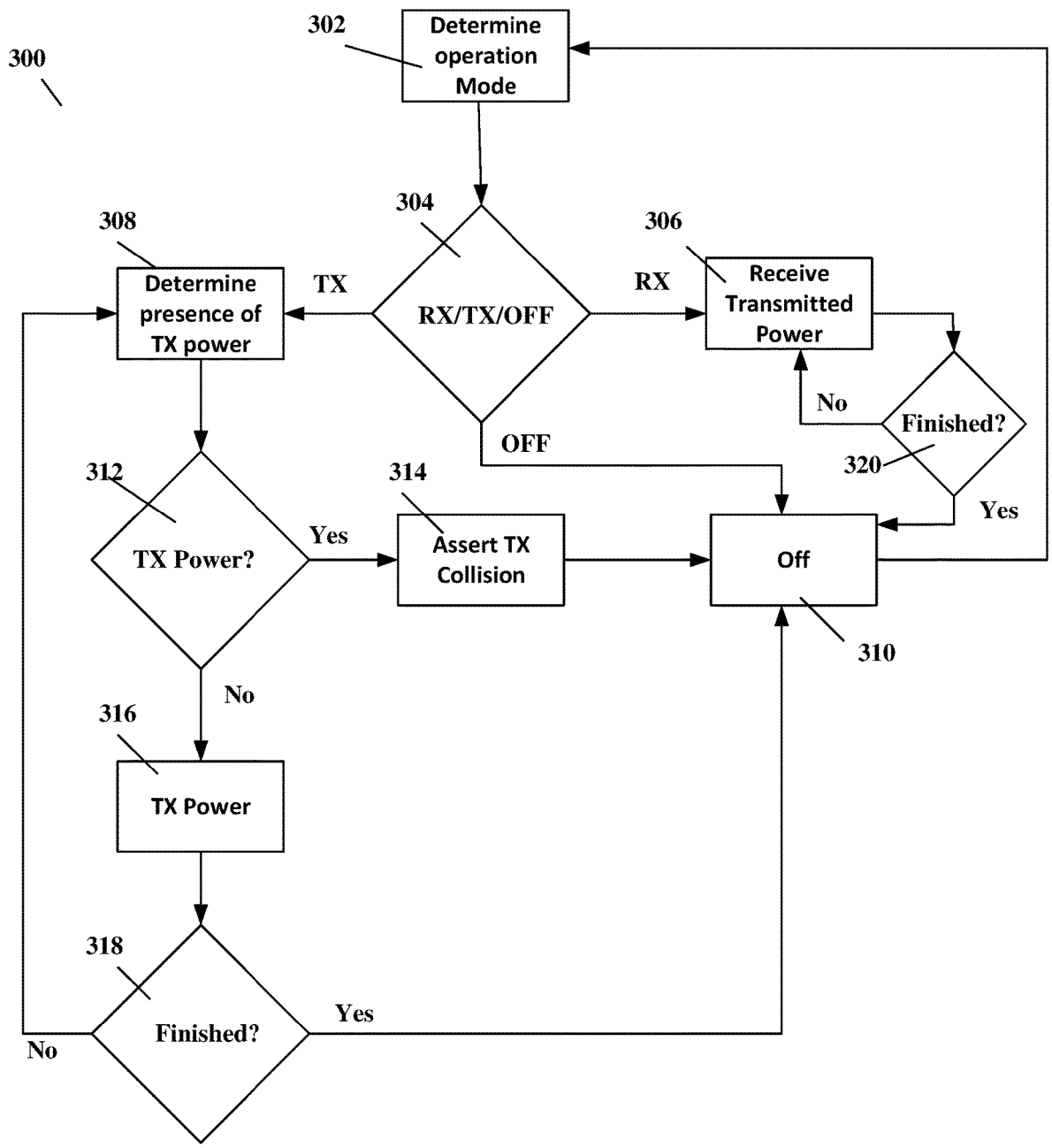
FIG. 3 illustrates a process for operation of the device as illustrated in FIG. 2.
These figures are further discussed below.

FIG. 3 illustrates a process 300 for operation of device 200 as illustrated in FIG. 2. In step 302 of process 300, device 200 determines an operating mode for device 200. In particular, device 200 may be in a receive mode RX, a transmit mode TX, or off. Device 200 may be in a receive mode RX when device is brought into proximity with a transmitting device. A user input may place device 200 in a transmit mode TX or place device 200 in an off mode (OFF) where the wireless power function is disabled. As discussed above, in some embodiments, device 200 may only include a transmit mode and an off mode.

In step 304, process 300 decides, based on the determination of step 302, the functional mode. If the functional mode is an OFF mode, process 300 proceeds to OFF state 310. In state 310, control circuit 210 prevents either of RX driver 204 or TX driver 212 from activating so that device 200 is neither transmitting or receiving wireless power. From the Off state 310, process 300 may return to determination step 302 to determine whether the mode has changed.

If, in step 304, a receive mode RX is determined, process 300 proceeds to step 306. In step 306, control circuit 210 activates RX driver 204 and DC circuit 206 to receive wireless power through coil 202. From step 306, process 300 may proceed to step 320, where it is determined whether device 200 is finished receiving power (e.g., a battery charging by device 200 is fully charged). If not, then process 300 returns to step 306 to continue receiving wireless power. If finished, then process 300 proceeds to off state 310.

If in step 304 a transmit mode TX is determined, process 300 proceeds to step 308. In step 308, control circuit 210 checks TX detect circuit 214 to determine if there is wireless power already present at coil 202. As discussed above, TX detect circuit 214 can indicate the presence of wireless power if a signal from rectifier 208 exceeds a threshold signal. In step 312, process 300 proceeds to step 314 if step 308 determines the presence of wireless power and step 316 if no wireless power is detected. In step 314, a TX collision alert is provided and process 300 proceeds to OFF state 310.

In the absence of wireless power, process 300 proceeds from step 312 to step 316. In step 316, control circuit 210 activates TX driver 212 to transmit wireless power through coil 202. In some embodiments, process 300 may proceed to step 318. In step 318, process 300 determines whether or not wireless transmission is finished. This may be determined when the receiving device is removed, when the receiving device signals cessation of charging, or when a user changes the device operation mode. If finished, then process 318 can proceed to OFF state 310 and then to step 302. If not finished, process 300 may proceed back to step 308 to monitor for the presence of wireless transmission.

Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. A wireless power device, comprising:
    a rectifier circuit coupled to a coil;
    a transmit driver coupled to the rectifier circuit, the transmit driver configured to provide power to the rectifier circuit during wireless power transmission through the coil;
    a transmit detect circuit configured to detect receipt of transmitted wireless power from a second wireless power device at the coil, wherein the transmit detect circuit includes discrete diode and demodulation circuitry to provide a rectified signal related to the transmitted wireless power; and
    a controller coupled to the transmit driver and the transmit detect circuit, the controller receiving the rectified signal from the transmit detect circuit and providing an alert of the presence of the transmitted wireless power from the second wireless power device, the controller activating the transmit driver to transmit wireless power in the absence of the rectified signal indicating the presence of the transmitted wireless power and asserting a collision alert in the presence of the rectified signal indicating the presence of the transmitted wireless power.

2. The device of claim 1, further including
    a receive driver coupled to the rectifier circuit; and
    a DC circuit coupled to receive and process a voltage from the rectifier circuit when the receive driver is activated by the controller.

3. The device of claim 1, wherein the controller executes instructions to
    determine an operating mode of the device;
    when the operating mode is a transmit mode,
        determine presence of a transmit power,
            when the transmit power is detected provide an alert and proceed to an off state, and
            when the transmit power is not detected, transmit wireless power; and
    when the operating mode is an off mode, proceeding to the off state.

4. The device of claim 3, further including
    a receive driver coupled to the rectifier circuit; and
    a DC circuit coupled to receive and process a voltage from the rectifier circuit when the receiver driver is activated by the controller, and
    wherein when the operating mode is a receive mode, receive wireless power by activating the receiver driver.

5. The device of claim 4, wherein in receive mode the controller transitions to the off state when charging is finished.

6. A method of operating a wireless power device, comprising:
    determining an operating mode of the wireless power device;
    in a transmit mode
        determining presence of a transmit power from a second wireless power device,
        when the transmit power from the second wireless power device is detected, providing a collision alert and proceeding to an off state where the wireless power device does not transmit wireless power, and
        when transmit power from the second wireless power device is not detected, activating a transmit driver to transmit wireless power from the wireless power device,
    wherein determining presence of a transmit power includes monitoring a rectified voltage using discrete diode and demodulation circuitry to provide the collision alert.

7. The method of claim 6, further including
    in an off state, deactivating the transmit driver.

8. The method of claim 6, further including
    in a receive state, activating a receive driver.

9. A method of operating a wireless power device, comprising:
    determining an operating mode of the wireless power device;
    in a transmit mode
        determining presence of a transmit power from a second wireless power device,
        when the transmit power from the second wireless power device is detected, providing a collision alert and proceeding to an off state, and
        when the transmit power from the second wireless power device is not detected, activating a transmit driver to transmit wireless power from the wireless power device,
    wherein determining presence of a transmit power includes monitoring a frequency of a voltage across a wireless coil with a frequency counter.

10. A wireless power device, comprising:
    a rectifier circuit coupled to a coil;

a transmit driver coupled to the rectifier circuit, the transmit driver configured to provide power to the rectifier circuit during wireless power transmission through the coil;

a transmit detect circuit configured to detect receipt of transmitted wireless power from a second wireless power device at the coil, wherein the transmit detect circuit detects receipt of transmitted wireless power with a frequency counter coupled to detect incoming voltage or current at the coil to provide a signal; and a controller coupled to the transmit driver and the transmit detect circuit, the controller receiving the signal from the transmit detect circuit and providing an alert of the presence of the transmitted wireless power, the controller activating the transmit driver to transmit wireless power in absence of the signal and a collision alert in the presence of the signal.

11. The device of claim 10, further including
a receive driver coupled to the rectifier circuit; and
a DC circuit coupled to receive and process a voltage from the rectifier circuit when the receive driver is activated by the controller.

12. The device of claim 10, wherein the controller executes instructions to
determine an operating mode of the device;
when the operating mode is a transmit mode,
determine presence of a transmit power,
when the transmit power is detected provide an alert and proceed to an off state, and
when the transmit power is not detected, transmit wireless power; and
when the operating mode is an off mode, proceeding to the off state.

13. The device of claim 12, further including
a receive driver coupled to the rectifier circuit; and
a DC circuit coupled to receive and process a voltage from the rectifier circuit when the receiver driver is activated by the controller, and
wherein when the operating mode is a receive mode, receive wireless power by activating the receiver driver.

14. The device of claim 13, wherein in receive mode the controller transitions to the off state when charging is finished.

* * * * *